US012146119B2

United States Patent

(12) United States Patent
Piorkowski et al.

(10) Patent No.: US 12,146,119 B2
(45) Date of Patent: Nov. 19, 2024

(54) TOILET CLEANING PRODUCT CONTAINING AQUEOUS CRYSTALLINE MATERIAL

(71) Applicant: Henkel AG & Co. KGaA, Dusseldorf (DE)

(72) Inventors: Daniel Thomas Piorkowski, Fairfield, CT (US); Christopher Michael Rodriguez, Brewster, NY (US); John Daniel Konikowski, Middletown, CT (US)

(73) Assignee: Henkel AG & Co. KGaA, Düsseldorf (DE)

( * ) Notice: Subject to any disclaimer, the term of this patent is extended or adjusted under 35 U.S.C. 154(b) by 259 days.

(21) Appl. No.: 17/444,630

(22) Filed: Aug. 6, 2021

(65) Prior Publication Data

US 2023/0046332 A1 Feb. 16, 2023

(51) Int. Cl.

| | |
|---|---|
| ***C11D 17/00*** | (2006.01) |
| ***C11D 9/04*** | (2006.01) |
| ***C11D 9/12*** | (2006.01) |
| ***C11D 9/16*** | (2006.01) |
| ***C11D 10/04*** | (2006.01) |
| ***C11D 17/04*** | (2006.01) |

(52) U.S. Cl.
CPC ........ *C11D 17/0073* (2013.01); *C11D 10/042* (2013.01)

(58) Field of Classification Search
None
See application file for complete search history.

(56) References Cited

U.S. PATENT DOCUMENTS

| | | | | |
|---|---|---|---|---|
| 2,121,952 | A * | 6/1938 | Colonius et al. .... | C11D 3/3937 510/303 |
| 4,493,124 | A | 1/1985 | Agapiou | |
| 4,642,836 | A | 2/1987 | Bokmiller | |
| 4,852,201 | A | 8/1989 | Wundrock et al. | |
| 5,888,002 | A | 3/1999 | Fenstersheib | |
| 6,463,620 | B2 | 10/2002 | Busha | |
| 6,939,841 | B2 | 9/2005 | Requejo | |
| 7,065,825 | B2 | 6/2006 | Minkler et al. | |
| 7,127,768 | B2 | 10/2006 | Blum et al. | |
| 7,146,676 | B2 | 12/2006 | Kubes et al. | |
| 7,159,265 | B2 | 1/2007 | Soller et al. | |
| 7,232,364 | B2 | 6/2007 | Hibbard | |
| 7,275,276 | B2 | 10/2007 | Jaszenovis et al. | |

(Continued)

FOREIGN PATENT DOCUMENTS

| | | |
|---|---|---|
| EP | 1553864 A2 | 7/2005 |
| EP | 1563045 A1 | 8/2005 |

(Continued)

OTHER PUBLICATIONS

Cui, Yong-hui, CN 108070484-A, published May 25, 2028, with English translation.*

*Primary Examiner* — Lorna M Douyon
(74) *Attorney, Agent, or Firm* — Blank Rome LLP

(57) ABSTRACT

A dissolvable toilet cleaning solid tablet includes an anionic surfactant; virgin soap pellets; and borax, and desirably, a carbonate or bicarbonate salt; and an acid. The borax comprises about 0.5% to about 10% by weight of the composition, and the virgin soap pellets comprise about 12% to about 25% by weight of the composition.

20 Claims, 1 Drawing Sheet

(56) References Cited

U.S. PATENT DOCUMENTS

| | | | | |
|---|---|---|---|---|
| 7,530,138 | B1 | 5/2009 | Platt | |
| 7,563,756 | B2 | 7/2009 | Brady | |
| 7,650,663 | B2 | 1/2010 | Michaels et al. | |
| 7,827,648 | B2 | 11/2010 | Soller et al. | |
| 9,408,521 | B2 | 8/2016 | Molinet et al. | |
| 2007/0079460 | A1 | 4/2007 | Tapp et al. | |
| 2007/0117728 | A1 * | 5/2007 | Myers | C11D 3/046 510/141 |
| 2008/0020959 | A1 * | 1/2008 | Salvador | C11D 9/225 510/133 |
| 2012/0196787 | A1 * | 8/2012 | Ghosh Dastidar | C11D 3/126 510/491 |
| 2012/0220516 | A1 * | 8/2012 | Smith | A61K 8/4933 510/390 |
| 2013/0104304 | A1 | 5/2013 | Wilson et al. | |
| 2016/0106274 | A1 | 4/2016 | Eun | |
| 2018/0132678 | A1 | 5/2018 | Farrow | |
| 2018/0296043 | A1 | 10/2018 | Meier et al. | |
| 2021/0052117 | A1 * | 2/2021 | O'Brien | A47L 13/26 |
| 2023/0050946 | A1 * | 2/2023 | Piorkowski | C11D 3/046 |

FOREIGN PATENT DOCUMENTS

| | | | | |
|---|---|---|---|---|
| ES | 2622227 | T3 | 7/2017 | |
| WO | WO 01/40427 | A1 * | 6/2001 | |
| WO | WO 01/49818 | A1 * | 7/2001 | |
| WO | WO 2005/061689 | A1 * | 7/2005 | |
| WO | WO-2009121890 | A1 * | 10/2009 | C11D 17/0069 |
| WO | WO 2018/211271 | A1 * | 11/2018 | |
| WO | WO 2022/233518 | A1 * | 11/2022 | |

* cited by examiner

TOILET CLEANING PRODUCT CONTAINING AQUEOUS CRYSTALLINE MATERIAL

FIELD OF THE INVENTION

The present invention is in the field of household and industrial cleaning in applications for cleaning toilets. The present invention relates to dissolvable unit dose formulations that can be used with a wand for manually cleaning toilets.

BACKGROUND OF THE INVENTION

Toilet brushes are typically used to swirl cleaning chemicals around a toilet bowl and then to scrub the sides of the bowl with those chemicals and water, so as to assist in removing stains along the bowl sides. After using such brushes, a consumer will typically attempt to rinse off the brush by swirling it in the bowl water. However, cleaning chemicals, feces, urine, and stray bits of paper typically found in the toilet can be retained on the brush or in its holder.

Numerous mechanical devices have been proposed to overcome disadvantages of a toilet brush having a permanently affixed head. Several commercially available products include a removable head that must be thrown away in the trash. For instance, US Patent Application Publication No. 2016/0106274 discloses a non-woven cleaning fabric layer comprising a cleaning composition, and a functional non-woven fabric layer comprising a functional composition. The cleaning composition comprises an anionic surfactant, an ethanolamine-based compound, a pigment, a dye, or a mixture thereof, and a solvent. The functional composition comprises a functional polymer and one or more surfactant.

GB 738,299 discloses a toilet cleaning device where the head is slipped into a swab and a toilet is then cleaned by wiping the swab around the surface of the bowl of the toilet. Removal of the swab is achieved by shouldering the swab against the rim of a toilet bowl and pulling the holder away to cause the swab to slip off, into the bowl, and dissolve prior to being flushed away. Other flushable and replaceable brush head elements are disclosed in e.g., U.S. Pat. Nos. 2,755,497, 4,031,673, 5,630,243, and 6,094,771 and GB 2,329,325.

U.S. Pat. No. 7,650,663 discloses flushable heads that are insertable in a permanent type of wand. The brush head may be a stack of sheets of water-dissolvable material. The sheets are compressed to bind them together into a stack. Surface indentations and piercing of layers at the indentations are used to bind the brush head layers together securely without the need for binding adhesives, and to facilitate clamping. The heads releasable from the wand and are said to break up and behave like toilet paper, so they are flushable after use.

However, flushable heads, such as those disclosed in U.S. Pat. No. 7,650,663 are water degradable, as opposed to dissolvable. Thus, oftentimes consumers will opt to discard these heads in their garbage for fear of clogging their toilets as flushable heads take longer to break up and/or have the tendency to degrade incompletely.

Water solubility (as opposed to degradability) is a desirable feature for a toilet cleaning "brush" because it allows the head to be flushed immediately after use, thereby avoiding the need to transport the dripping head to a garbage can, and avoiding any odors that may develop if the brush head were left in a garbage can for some time period after use. It also avoids the potential for clogging that can occur when ingredients of a pad dissolve incompletely and/or take a long time to break up.

U.S. Pat. No. 5,471,697 discloses a toilet cleaning device that has a cleaning head in the shape of a foot. This head is able to clean underneath the rim of the toilet. However, a user has to continually rotate the device as they clean underneath the rim which involves two hands. This is inconvenient and it also causes one of the hands to be closer to the bowl which may have germs. The disposable feet are made from enzyme-coated biodegradable polymer particles, acrylic polymers, vinyl polymers or copolymers containing acid groups, sodium propionate or polyethylene glycol; thus, they are expensive and may take considerable time to dissolve. Furthermore, in order to remove the head from the shaft, the shaft has to be left in the toilet bowl while the head dissolves. This renders the toilet unusable during that period.

WO 2014/039356A1 discloses dissolvable unit doses with an applicator for cleaning toilets but provides no details on a suitable cleaning formulation for the dissolvable unit dose.

There is a need for improved toilet "brush" head formulations. In particular, there is a need for solid unit dose cleaning compositions that can be attached to a wand apparatus to mechanically clean a toilet bowl surface and that are dissolvable in toilet water after they are used to clean the bowl.

There is a desire in particular for improved dissolvable toilet brush formulations that can be marketed and labeled as "OXI" products.

It is an object of the invention to provide a dissolvable toilet brush product that has a good dissolution rate, a strong structural integrity (so it does not crack during shipment or while in use), provides good foaming (an indication of cleaning efficacy), and is resistant to significant humidity abuse.

SUMMARY OF THE INVENTION

The foregoing is achieved by provision of dissolvable solid unit dose formulations e.g., compressed tablets, that can be used with a wand apparatus to clean a toilet surface. The unit doses can be removably attached to the cleaning wand. The dissolvable formulations alleviate fear of flushing solid material and enables the consumer to clean the toilet and then see the solid dissolve during/after use. The formulations include surfactants, carbonates, acids (for biocidal effects), virgin soap pellets, and a boron compound that can form aqueous crystals when exposed to toilet water. Such formulations not only enable a product that has a good dissolution rate, structural integrity (so it does not crack during shipment or while in use), provides foaming (an indication of cleaning efficacy), and is resistant to significant humidity abuse, but also improves cleaning time compared to formulations without a boron compound.

In one embodiment, a solid unit dose toilet cleaning composition includes an anionic surfactant; virgin soap pellets; a carbonate or bicarbonate salt; an acid; and borax.

In various embodiments, the borax comprises about 0.5% to about 10% by weight of the composition, and the virgin soap pellets comprise about 12% to about 25% by weight of the composition. The virgin soap pellets may comprise about 55% to about 90% by weight of a soap mixture, about 0.5% to 5% by weight free fatty acids, glycerin, and one or more chelating agents or stabilizers, and the soap mixture will preferably comprise monovalent salts of tallow and palm kernel fatty acids. The anionic surfactant is preferably selected from Sodium Dodecylbenzenesulfonate, Sodium Cocoyl Isethionate, Sodium Olefin Sulphonate, and combinations thereof. The acid preferably comprises about 1% to about 30% by weight of the cleaning composition, and the acid preferably consists of glycolic acid or citric acid. The unit dose preferably weighs about 25 to about 45 grams, and the time to breakage of the unit dose when submerged in toilet water is delayed compared to a unit dose having no boron compound.

In another embodiment, a dissolvable toilet cleaning tablet includes an anionic surfactant; virgin soap pellets; and one or more boron compounds, and greater than 20% of the tablet dissolves when placed in 700 mL of water for 10 minutes with no agitation.

The solid unit dose toilet cleaning composition and/or dissolvable toilet cleaning tablet has a hardness of 15 N or greater than 15 N.

In another embodiment, a solid toilet cleaning composition includes: about 5% to about 50% by weight anionic surfactant; about 5-20% by weight of a carbonate or bicarbonate salt; about 1% to about 30% by weight of an acid; about 12% to about 25% by weight virgin soap pellets; and about 0.5% to about 10% by weight of a boron compound. The boron compound comprises 70% or more of sodium tetraborate. The virgin soap pellets comprise about 55% to about 90% by weight of a soap mixture, about 0.5% to 5% by weight free fatty acids, glycerin, and one or more chelating agents or stabilizers. The soap mixture comprises monovalent salts of tallow and palm kernel fatty acids. The time to breakage of the unit dose when submerged in toilet water is delayed compared to a unit dose having no boron compound.

The various embodiments have a top surface, a bottom surface, and a height extending from the top surface to the bottom surface. The unit dose comprises an indentation in at least one of its surfaces that is adapted to receive and engage a wand. The indentation is from 25% to 100% of the height of the solid. The various embodiments may be sold with a wand.

DETAILED DESCRIPTION OF THE INVENTION

Figure 1:
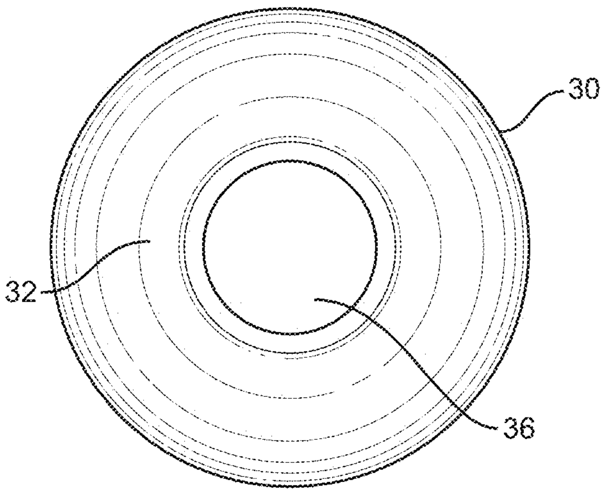
FIG. 1 is a photograph illustrating a top view of a solid unit dose toilet cleaning composition of the present invention that can be releasably attached to a wand.

The following detailed description is merely exemplary in nature and is not intended to limit the compositions or the methods for producing or using the same. Furthermore, there is no intention to be bound by any theory presented in the preceding background or the following detailed description.

Except in the operating and comparative examples, or where otherwise explicitly indicated, all numbers in this description indicating amounts or ratios of material or conditions of reaction, physical properties of materials and/or use are to be understood as modified by the word "about".

The term "about" as used in connection with a numerical value throughout the specification and the claims denotes an interval of accuracy, familiar and acceptable to a person skilled in the art. In general, such interval of accuracy is +−10%. Thus, "about ten" means 9 to 11. All numbers in this description indicating amounts, ratios of materials, physical properties of materials, and/or use are to be understood as modified by the word "about," except as otherwise explicitly indicated.

Weight percent, percent by weight, wt %, wt-%, % by weight, and the like are synonyms that refer to the concentration of a substance as the weight of that substance divided by the weight of the composition and multiplied by 100. As used in this application, the term "wt. %" refers to the weight percent of the indicated component relative to the total weight of the solid cleaning composition, unless indicated differently. The weight percentage of an individual component does not include any water supplied with that component, even if the component is supplied as an aqueous solution or in a liquid premix, unless otherwise specified.

The recitation of numerical ranges by endpoints includes all numbers within that range (e.g., 1 to 5 includes 1, 1.5, 2, 2.75, 3, 3.80, 4, and 5).

Provided herein are dissolvable solid unit dose toilet cleaning compositions, which are typically produced in the form of compressed solids or tablets comprising several components: an anionic surfactant, a carbonate or bicarbonate salt, an acid, virgin soap pellets and a boron compound. The solid products can be used with a releasably connected wand or handle as a toilet brush. It has been surprisingly found that inclusion of a boron compound improves the friability and cleaning power of the solid cleaning compositions by lengthening the cleaning time before the solid breaks from the wand once it has been exposed to toilet water yet still allowing for the solid to substantially or completely dissolve in less than 15 minutes. This enables the user to flush the tablet shortly after cleaning has ended without fear of clogging the toilet.

"Cleaning" means to perform or aid in soil removal, bleaching, microbial population reduction, or combination thereof.

As used herein, the term "comprising" means including, made up of, composed, characterized by, or having.

As used herein, the term "brush" means an implement with a handle and including of a solid member at one end that can be used for cleaning, scrubbing, applying a liquid or powder to a surface. The solid member of the brush may be referred to as a "head."

As used herein, a "solid cleaning composition" refers to a cleaning composition in the form of a solid for example, a granule, a pellet, a tablet, a lozenge, a puck, a briquette, a brick, a solid block, or a unit dose. The term "solid" refers to the state of the detergent composition under the expected conditions of storage and use of the solid detergent composition. In general, it is expected that the cleaning composition will remain in solid form when exposed to temperatures of up to about 100° F. and greater than about 120° F.

A "stable solid" composition refers to a solid that retains its shape under conditions in which the composition may be stored or handled.

A solid unit dose refers to a cleaning composition unit sized so that the entire unit is used during a single cleaning cycle. When the solid cleaning composition is provided as a unit dose, it is preferably provided as a compressed solid, such as a tablet having a size of between about 1 gram and about 50 grams. Furthermore, it should be appreciated that the solid cleaning composition can be provided so that a plurality of the solids will be available in a package having a size of between about 40 grams and about 1,000 grams.

The solid head may be in various compressed, cast, or extruded forms including, for example, pellets, blocks, and tablets, but not powders.

The present invention also provides methods of production of such compositions, and methods of use of such compositions in processes for cleaning toilets by introducing one of the unit dose products into a toilet bowl, whereby the cleaning system is released such that it comes into contact with a soiled toilet bowl under conditions for the removal of one or more soils from the toilet bowl. The unit doses dissolve in toilet water after they are used to clean the bowl.

Figure 2:
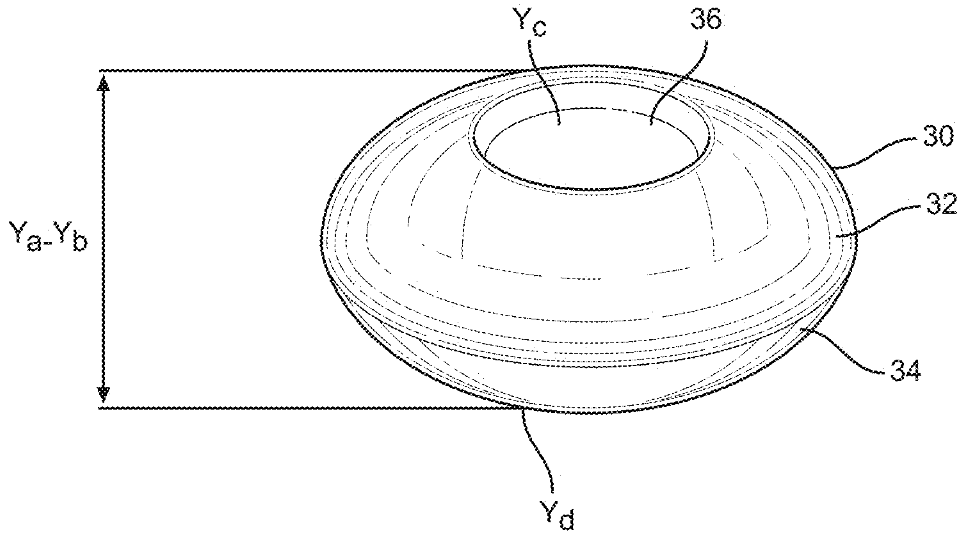
FIG. 2 is a perspective view of the unit dose of FIG. 1.

An exemplary solid unit dose composition of the present invention is shown in FIGS. 1 and 2. The head 30 contains a top surface 32, a bottom surface 34, and a height Ya-Yb extending from the top surface to the bottom surface. An indentation, specifically, a cylindrical socket 36 is contained in the top surface and is adapted to receive and frictionally engage with a wand (not shown). The depth Yc-Yd of the cylindrical socket 36 is the same as height Ya-Yb or may be less than the height Ya-Yb.

The unit dose head 30 contains a cleaning composition comprised of powders and pellets that have been compressed into a tablet.

Cleaning head 30 is shown as substantially cylindrical and having a diameter but it may take other shapes. Cleaning head 30 is shown having a center circular hole for engaging with a toilet wand; however, cleaning head within the scope of the invention may not have a center circular hole or may have other means to engage with a toilet wand.

The solid head 30 may be in various forms including, for example, pellets, blocks, and tablets, but not powders.

In certain embodiments, the solid unit dose cleaning head 30 weighs about 1 to about 70 grams, more preferably about 10 to about 50 grams, most preferably about 20 to about 40 grams.

In certain embodiments, the solid unit dose cleaning head has height of about 0.45 to about 0.8 inches. In some embodiments, the solid unit dose cleaning head has a height of about 0.5 to 0.7 inches. In other embodiments, the solid unit dose cleaning head has a height of about 0.55 to 0.65 inches.

In some embodiments, the solid unit dose cleaning head has a diameter of about 1.5 to 3 inches, more preferably about 1.75 to 2.5 inches, most preferably about 2 to 2.375 inches.

In certain embodiments, the solid unit dose cleaning head has a height to diameter ratio that is greater than 2:1.

In some embodiments, the solid unit dose cleaning head is a tablet having a hardness of at least 15 N, more preferably at least 20 N, most preferably at least 30 N. In certain preferred embodiments, the tablet has a hardness greater than 50 N.

The solid cleaning composition contains one or more chemical constituents e.g., cleaning agents, disinfecting agents, and optionally, coloring agents, and fragrance in the form of a head. The cleaning activity is formed by water contacting the head of the device coming into contact with the one or more chemical constituents.

In preferred embodiments, the cleaning composition provides cleaning efficacy, a foaming visual cue, fragrance sensorial experience and slowly dissolves so one does not have to re-store or throw away the cleaning head portion of the product. The toilet cleaning head is advantageously dissolvable, which negates the need for the consumer to store an unpleasant, bacteria filled cleaning tool.

Cleaning Composition

Surfactant

The toilet cleaning composition comprises one or more surfactants, of which one or more is anionic, and the additional surfactants may be cationic and/or non-ionic and/or semi-polar and/or zwitterionic, or a mixture thereof. In a particular embodiment, the cleaning composition includes a mixture one or more anionic surfactants with one or more non-ionic surfactants. The total active surfactant(s) is typically present at a level of from about 5% to 40% by weight, such as about 7% to about 35%, based on total weight of the cleaning composition. The surfactant(s) is chosen based on the desired cleaning application, and may include any conventional surfactant(s) known in the art.

Anionic surfactants are useful in the context of this invention to both improve the cleaning properties of the compositions. The anionic surfactants used in this invention can be any anionic surfactant that is substantially water soluble. "Water soluble" surfactants are, unless otherwise noted, here defined to include surfactants which are soluble or dispersible to at least the extent of 0.01% by weight in distilled water at 25° C. "Anionic surfactants" are defined herein as amphiphilic molecules with an average molecular weight of less than about 10,000, comprising one or more functional groups that exhibit a net anionic charge when in aqueous solution at pH of between 6 and 11.

Non-limiting examples of anionic surfactants include sulfates and sulfonates, in particular, linear alkylbenzenesulfonates (LAS), isomers of LAS, branched alkylbenzenesulfonates (BABS), phenylalkanesulfonates, alpha-olefinsulfonates (AOS), olefin sulfonates, alkene sulfonates, alkane-2,3-diylbis(sulfates), hydroxyalkanesulfonates and disulfonates, alkyl sulfates (AS) such as sodium dodecyl sulfate (SDS), fatty alcohol sulfates (FAS), primary alcohol sulfates (PAS), alcohol ethersulfates (AES or AEOS or FES, also known as alcohol ethoxysulfates or fatty alcohol ether sulfates), secondary alkanesulfonates (SAS), paraffin sulfonates (PS), ester sulfonates, sulfonated fatty acid glycerol esters, alpha-sulfo fatty acid methyl esters (alpha-SFMe or SES) including methyl ester sulfonate (MES), alkyl- or alkenylsuccinic acid, dodecenyl/tetradecenyl succinic acid (DTSA), fatty acid derivatives of amino acids, diesters and monoesters of sulfo-succinic acid or salt of fatty acids (soap), and combinations thereof.

The anionic surfactant may be, for example, Sodium Xylene Sulphonate, Sodium Dodecylbenzenesulfonate, Sodium C14-C16 Alpha Olefin Sulfonate, Sodium Cocosulfate, Sodium Lauryl Sulfate, Sodium Cocoyl Isethionate, Sodium Olefin Sulphonate.

In some preferred embodiments, the anionic surfactant is a LAS.

In certain preferred embodiments, the anionic surfactant is selected from Sodium Dodecylbenzenesulfonate, Sodium Cocoyl Isethionate, Sodium Olefin Sulphonate, and combinations thereof.

The cleaning composition will usually contain from about 5% to about 40% by weight of anionic surfactant. In certain embodiments, the cleaning composition contains about 7% to about 35% by weight of anionic surfactant. In some preferred embodiments, the cleaning compositions contain about 10% to about 30% by weight of anionic surfactant.

The amount of anionic surfactant utilized may be dependent on the choice and amount of filler and/or soap pellets and the desired dissolution rate of a solid unit dose formed from the cleaning composition, as is discussed in further detail below.

Non-ionic surfactants may also be useful in the context of this invention to both improve the cleaning properties of the compositions and to contribute to product stability. A wide range of non-ionic surfactants can be used herein. For example, the non-ionic surfactants include, but are not limited to alkoxylated alcohols, polyoxyalkylene alkyl ethers, polyoxyalkylene alkylphenyl ethers, polyoxyalkylene sorbitan fatty acid esters, polyoxyalkylene sorbitol fatty acid esters, polyalkylene glycol fatty acid esters, alkyl polyalkylene glycol fatty acid esters, polyoxyethylene polyoxypropylene alkyl ethers, polyoxyalkylene castor oils, polyoxyalkylene alkylamines, glycerol fatty acid esters, alkylglucosam ides, alkylglucosides, alkylamine oxides, or a combination thereof. Preferably, the nonionic surfactant is a glucamide in aqueous-alcoholic solution, such as Capryloyl/Caproyl Methyl Glucamide.

If included in the cleaning compositions, the amount of non-ionic surfactant is typically about 1 weight percent to about 20 weight percent based on the total weight of the cleaning composition. Preferably, the on-ionic surfactant is at least about 1.5 weight percent, most preferably about 1.5 to about 15 weight percent based on total weight of the cleaning composition.

When included therein the cleaning composition will usually contain from about from about 1% to about 40% by weight of a cationic surfactant, for example from about 0.5% to about 30%, in particular from about 1% to about 20%, from about 3% to about 10%, such as from about 3% to about 5%, from about 8% to about 12% or from about 10% to about 12%. Non-limiting examples of cationic surfactants include alkyldimethylethanolamine quat (ADMEAQ), cetyltrimethylammonium bromide (CTAB), dimethyldistearylammonium chloride (DSDMAC), and alkylbenzyldimethylammonium, alkyl quaternary ammonium compounds, alkoxylated quaternary ammonium (AQA) compounds, ester quats, and combinations thereof.

The cleaning composition may contain from about 0% to about 40% by weight of a semipolar surfactant. Non-limiting examples of semipolar surfactants include amine oxides (AO) such as alkyldimethylamineoxide, N-(coco alkyl)-N,N-dimethylamine oxide and N-(tallow-alkyl)-N,N-bis(2-hydroxyethyl)amine oxide, and combinations thereof.

The cleaning composition may contain from about 0% to about 40% by weight of a zwitterionic surfactant. Non-limiting examples of zwitterionic surfactants include betaines such as alkyldimethylbetaines, sulfobetaines, and combinations thereof.

Filler

The cleaning composition can include about 0% by about 80% by weight of non-soap fillers.

In certain embodiments, the filler optionally comprises water-soluble salts, sugars and/or clays.

The filler can be, for example, a water-soluble inorganic alkali metal salt, a water-soluble organic alkali metal salt, a water-soluble inorganic alkaline earth metal salt, a water-soluble organic alkaline earth metal salt, a water-soluble carbohydrate, a water-soluble silicate, a water-soluble urea, or any combination thereof.

The filler can be, for example, sodium chloride, potassium chloride, calcium chloride, magnesium chloride, sodium sulfate, potassium sulfate, magnesium sulfate, sodium carbonate, potassium carbonate, sodium hydrogen carbonate, potassium hydrogen carbonate, sodium acetate, potassium acetate, sodium citrate, potassium citrate, sodium tartrate, potassium tartrate, potassium sodium tartrate, calcium lactate.

A sugar filler may also be use. In the present context, sugar fillers refer to saccharide containing components commonly known in the art, such as sucrose, dextrose, maltose, saccharose, lactose, sorbose, dextrin, trehalose, D-tagatose, dried invert sugar, fructose, levulose, galactose, corn syrup solids, and the like, alone or in combination.

The filler can be, for example, dextrose, fructose, galactose, isoglucose, glucose, sucrose, raffinose, isomalt, xylitol, or any combination thereof.

In certain embodiments, the filler consists essentially of a clay, a sugar, or a salt, and combinations thereof. In some of those embodiments, the filler consists essentially of a clay. In other of those embodiments, the filler consists essentially of a salt. In yet other of those embodiments, the filler consists essentially of a sugar.

In some embodiments, the filler consists of a clay, a sugar, or a salt, and combinations thereof. In some of those embodiments, the filler consists of a clay. In other of those embodiments, the filler consists of a salt. In yet other of those embodiments, the filler consists of a sugar.

In one embodiment, the carrier or water-soluble carrier is sodium chloride.

In one embodiment, the carrier or water-soluble carrier is table salt.

In some embodiments, the filler is or includes a clay. In one embodiment, the clay is a smectite clay, e.g., a Bentonite clay, Beidellite clay, a Hectorite clay, a Laponite clay, a Montmorillonite clay, a Nontronite clay, a Saponite clay, a Sauconite, clay, or any combination thereof.

In one embodiment, the clay is a Bentonite clay.

In certain embodiments, the filler comprises abrasive particles.

In certain preferred embodiments, abrasive particles are formed in situ from inclusion of a boron compound, such as borax, in the compositions, which is discussed in more detail below.

The other components of the cleaning composition can act as a binder and carrier to secure the abrasive particles until they are exposed to a solvent. For instance, the water-soluble binder may be a surfactant. Additionally, the water-soluble binder may include a combination of various water-soluble binders, one of which may be a surfactant. Also, the water-soluble binder may include a combination of various surfactants. A surfactant is preferable because it provides additional cleaning capabilities to the cleaning composition.

The solvent begins dissolving the binder and other components and the abrasive particles release from the cleaning composition. By including abrasive particles, the cleaning composition provides for both scouring and cleaning of a surface.

The abrasive particles include the abrasive materials as well as combinations and agglomerates of such materials. In applications where aggressive scouring or other end uses are not contemplated or desired, softer abrasive particles (e.g., those having a Mohs' hardness in the range between 1 and 7) can be used to provide the head 30 with a mildly abrasive surface. Harder abrasive materials (e.g., having a Mohs' hardness greater than about 8) can also be included within the abrasive cleaning article of the invention to provide a finished article having a more aggressive abrasive surface.

In certain embodiments, the ratio of surfactant to filler is from 1:6 to 5:1. In preferred embodiments, the ratio of surfactant to filler is from about 1:4 to about 4:1.

In certain preferred embodiments, the ratio of surfactant to filler is about 1:1.5 to about 1:4.

In some preferred embodiments, the ratio of surfactant to filler is about 1:1.5.

Virgin Soap Pellets

Inclusion of virgin soap pellets, such as those used to make soap bars, can improve the cleaning performance of the compositions herein. The cleaning compositions will typically include about 5% to about 35% by weight, more preferably 7% to 25% by weight, most preferably 12% to 20% by weight of virgin soap pellets.

In a typical soap making operation, after the soap is dried it is usually pelletized and then subject to amalgamation in a piece of equipment called an amalgamator where a non-aqueous slurry of colorant, perfume and optional additives that are desired in the final product (such as antibacterial agents, polymers, silicones, encapsulated materials) are added. As used herein, "virgin soap pellets" refers to the soap pellets produced prior to the addition of colorant, perfume and optional additives.

That is, the virgin soap pellets contemplated herein comprise one or more "soaps," which, for purposes of describing this component of the compositions of the present invention, have the meaning as normally understood in the art: monovalent salts of monocarboxylic fatty acids.

The counterions of the salts generally include sodium, potassium, ammonium and alkanol ammonium ions, but may include other suitable ions known in the art.

Typically, the soap components comprise salts of long chain fatty acids having chain links of the alkyl group of the fatty acids from about 8 carbon atoms, to about 18 carbon atoms in length. The particular length of the alkyl chain of the soaps is selected for various reasons including cleansing capability, lather capability, cost, and the like. Preferred soaps are those having a carbon chain length of from 12 to 24, preferably from 14 to 18 carbon atoms. These monovalent salts would normally be sodium salts, although some cations, such as potassium, magnesium, or alkanolammonium ions could be used. The preferred insoluble fatty acid soap is at least 90% by weight, more preferably at least 95% by weight selected from the group consisting of sodium tallowate, sodium palm kernelate, sodium myristate, sodium palmitate, sodium stearate and mixtures of any two or more thereof. Other insoluble soaps, particularly higher fatty acid insoluble soaps, can also be used. An 85/15 ratio of tallow to palm kernel fatty acids is particularly preferred as the pure soap component of virgin soap pellets.

The virgin soap pellets will typically include greater than 50% by weight of a soap mixture. Preferably, the soap pellet base will include about 55% to about 90% by weight of one or more soaps. In a preferred embodiment of the invention, the soap mixture comprises about 70% to about 75% by weight of the soap pellet base composition.

Among the additives employed in the soap pellet base are free fatty acids (FFA) which serve to enhance the lathering or foaming ability of the bars. Such fatty acids also have an effect on the mildness of the soap.

Exemplary useful fatty acids include, but are not limited to: Arachidic Acid, Arachidonic Acid, Beeswax Acid, Behenic Acid, Capric Acid, Caproic Acid, Caprylic Acid, C10-40 Hydroxyalkyl Acid, C10-40 Isoalkyl Acid, C32-36 Isoalkyl Acid, Coconut Acid, Corn Acid, Cottonseed Acid, Erucic Acid, Hydrogenated Coconut Acid, Hydrogenated Menhaden Acid, Hydrogenated Palm Acid, Hydrogenated Tallow Acid, Hydroxystearic Acid, Isomerized Linoleic Acid, Isomerized Safflower Acid, Isostearic Acid, Lauric Acid, Linoleic Acid, Linolenic Acid, Linseed Acid, Myristic Acid, Oleic Acid, Olive Acid, Palmitic Acid, Palm Kernel Acid, Peanut Acid, Pelargonic Acid, Rapeseed Acid, Rice Bran Acid, Ricinoleic Acid, Safflower Acid, Soy Acid, Stearic Acid, Sunflower Seed Acid, Tall Oil Acid, Tallow Acid, Undecanoic Acid, Undecylenic Acid, Wheat Germ Acid.

In certain embodiments, the virgin soap pellet base comprises about 0.5% to 5% free fatty acids.

The soap pellets used in the present invention may comprise one or a combination of water-soluble polyhydric organic solvents including Preferred water soluble organic polyols having two hydroxyl groups (2-OH) include those selected from the group consisting of: propylene glycol; dipropylene glycol; butylene glycol; ethylene glycol; 1,7-heptanediol; monoethylene glycols, polyethylene glycols, polypropylene glycols of up to 8,000 molecular weight; mono-C1-4 alkyl ethers of any of the foregoing; and mixtures thereof. Preferred water-soluble polyhydric solvents that have at least three hydroxyl groups (3k-OH) include glycerine, and any sugar alcohol, such as sorbitol.

Examples of suitable sugar alcohols include: Tetritols: Erythritol, threitol, D-threitol, L-threitol, and D,L-threitol; Pentitols: Ribitol, arabinitol, D-arabinitol, L-arabinitol, D,L-arabinitol and xylitol; Hexitols: Allitol, dulcitol (galacitol), glucitol, sorbitol, (D-glucitol), L-glucitol, D, L-glucitol, D-mannitol, L-mannitol, D,L-mannitol, altritol, D-altritol, L-altritol, D, L-altritol, iditol, D-iditol, and L-iditol; Disaccharide alcohols: Maltitol, lactitol and isomalt.

Preferably, the soap pellet base composition comprises glycerin, sorbitol, or a mixture of glycerin and sorbitol. In one exemplary embodiment, the soap pellet base comprises about 5% to about 10% by weight glycerin.

Preferably, the soap base composition also comprises water. In one exemplary embodiment of the present invention, the soap pellet base composition comprises about 10 to about 20% by weight water. In a preferred embodiment of the present invention, the soap pellet base composition comprises about 12 to about 16% by weight water.

The soap pellets may further comprise one or more chelating agents, organic and inorganic salts, and/or stabilizers.

A soap mixture may be manufactured by saponifying suitable raw oils, such as, for example, tallow, palm oil, stearin oil and palm kernel oil, with a caustic solution, such as sodium hydroxide, to form a "neat soap." The pH of the neat soap may be alkaline when produced and can be suitably adjusted by the addition of an organic acid, such as citric acid. Free fatty acid may also be added to the neat soap to neutralize any undesirable excess caustic solution and to enhance the lather characteristics of the resulting soap. Optionally, at this stage of the process, preservative agents, chelating agents, and inorganic and/or organic salts may also be added to form the soap pellet base composition. The neat soap may then be spray dried to reduce the moisture content of the soap, yielding soap pellets. In one embodiment of the invention, the moisture content is reduced to about 10% by weight of the soap pellets, with about 5% water available.

In certain embodiments, the virgin soap pellets have water activity of about 0.68. Such pellets can optionally be dried to lower the water activity to as low as 0.04. Both undried and dried pellets yield useful solid toilet cleaning products, but dried pellets may be preferred in some instances due to less moisture in a final compressed product.

Although described in terms of pellets, the soap pellet base composition may be prepared in other forms for addition into the inventive cleaning compositions. The term "virgin soap pellets" is meant to encompass pellets as well as other forms (e.g., granules, ribbons, slugs) of the virgin soap base composition described herein.

Boron Compound

The cleaning compositions will typically comprise about 0.5% to about 10% by weight, preferably about 1% to about 8% by weight, most preferably about 2% to 4% by weight of a boron compound.

Examples of boron compounds which can be used in the context of the present invention are boric acid, boron oxide, alkali metal borates such as ammonium, sodium and potassium ortho, meta and pyroborates, borax in its various hydration stages and polyborates such as alkali metal pentaborates, and sodium perborate.

Also, organic boron compounds such as esters of boric acid are usable, as well as e.g. reaction products of $H_3BO_3$ with nonionic surfactants and/or fragrances.

Preferably, the compositions include powdered borax at about 0.5% to about 10% by weight of the cleaning composition, more preferably about 1% to about 8%, most preferably about 2% to about 4% by weight of the cleaning composition. Preferably the boron compound consists essentially of or consists entirely of borax.

As used herein, borax refers to these closely related minerals or chemical compounds that differ in their crystal water content: anhydrous borax: sodium tetraborate ($Na_2B_4O_7$); borax pentahydrate ($Na_2B_4O_7.5H_2O$); and borax decahydrate ($Na_2B_4O_7.10H_2O$), and also includes the borates formed by the borax during use.

Preferably, the boron compound comprises 50% or more, 60% or more, preferably 70% or more of sodium tetraborate.

In use as a hard surface cleaner, borax is utilized in its solid particulate form as an abrasive. Borax particles have a particle size as measured by sieve diameter. A sieve diameter is defined as the width of the minimum square aperture through which the particle will pass. Typically, particles within a batch will have a distribution of particle sizes. Exemplary borax particles are those in which a majority of particles have a sieve diameter of at least 0.04 mm, such as at least about 0.05 mm, for example at least about 0.06 mm. In an exemplary embodiment, a majority of the particles have a sieve diameter of at least 0.07 mm, or at least about 0.08 mm. In another exemplary embodiment, a majority of the particles have a sieve diameter of at least 0.09 mm, or at least about 0.10 mm. Exemplary borax particles used herein have a particle size distribution such that no more than about 0.1% of the borax particles have a sieve diameter of at least 2.38 mm, no more than about 35% of the borax particles have a sieve diameter of at least 0.595 mm, and at least about 75% of the borax particles have a sieve diameter of at least 0.074 mm.

Exemplary abrasive borax particles used herein have a Mohs hardness of about 2 to about 3, i.e., from gypsum (2) to calcite (3). An exemplary cleaning composition employing an abrasive comprising borax provides superior soap scum and bathroom soil removal and good surface safety. "Surface safety" refers to a property of acceptable and minimal damage to a glossy or shiny hard surface as measured by reduction of gloss versus an uncleaned hard surface.

In embodiments, the aforementioned composition is provided with abrasive consisting essentially of borax. The amount of borax employed in the cleaning composition is typically greater than can be solubilized in the amount of water included in the cleaning composition or in the total amount of water included in the cleaning composition and used in conjunction with the cleaning composition. Therefore, a portion of the borax remains undissolved and suspended during surface cleaning. This suspension of borax acts as an abrasive for enhanced cleaning performance, especially for cleaning of stubbornly adhering soils on smooth or glossy hard surfaces. Borax has a solubility in water of about 38.1 g/L at 20° C., a solubility in glycerol or about 1 g/L at room temperature, is slightly soluble in ethanol and is insoluble in acids. A saturated aqueous solution of borax will comprise about 3.79 weight percent (wt. %) borax at 15° C., about 4.71 wt. % borax at 20° C., about 5.80 wt. % borax at 25° C., and about 7.20 wt. % borax at 30° C.

Powdered borax is less soluble in cold water and acts as an abrasive to clean the toilet bowl both above the water and in the water in toilets. The efficacy of borax as an abrasive will be greater when the toilet bowl water is colder, for example, during colder parts of the year and/or all year in northern climates, and/or in southern climates in air-conditioned locations or locations where water is drawn from cold underground locations. However, without wishing to be bound by theory, it is believed that when powdered borax containing compositions are submerged in toilet water, some of the borax is acidified by the acid contained in the composition forming crystalline boric acid, which further forms an aqueous crystalline abrasive agent that helps to manually clean the toilet bowl surfaces. Thus, borax can form an in situ aqueous crystalline material that aides in cleaning the portion of the bowl submerged in water even when the toilet bowl water is at higher temperatures.

Also, in the wash water, the borax may improve surfactant performance by minimizing precipitation of a calcium/surfactant complex. To improve surfactant performance, positively charged calcium ions associated with toilet waters and certain soils are desirably prevented from complexing with the negatively charged surfactants used in the cleaning composition, since the resultant complexes are insoluble. Should this reaction take place, some of the surfactant is effectively removed and unable to perform its function. Borax minimizes the precipitation of important types of negatively charged surfactants and may prevent such precipitation (unless exceptionally high levels of calcium are present in the toilet water). Borax provides successful competition with the surfactant for the metal ions, such as calcium ions or magnesium ions, and forms soluble complexes, thus enhancing the water softening qualities of the detergent as discussed above.

Carbonate or Bicarbonate Salt

Examples of carbonate or bicarbonate salts suitable for use in illustrative embodiments include, but are not limited to, the alkali metal salts. Sodium carbonate, calcium carbonate, magnesium carbonate, ammonium carbonate, potassium carbonate, sodium bicarbonate, and calcium bicarbonate may all be employed.

The carbonate or bicarbonate salt may in conjunction with a selected filler provide the cleaning composition with the aforementioned abrasive particles or the abrasive particles may be provided by the borax alone or in conjunction with the carbonate or bicarbonate salt.

The carbonate or bicarbonate salts may be added in an amount of about 1% to about 30% by weight of the composition, more preferably about 5% to about 25% by weight of the composition, most preferably about 10% to about 20% by weight of the composition.

Acid

Examples of acids suitable for use the cleaning compositions include, but are not limited to, tartaric acid, citric acid, fumaric acid, adipic acid, malic acid, oxalic acid, or sulfamic acid, either alone or in combination. Typically, the compositions are prepared from citric acid or a combination of citric acid and glycolic acid.

The acid comprises about 1% to about 30% by weight of the cleaning composition. In some embodiments, the acid comprises at least 5% by weight of the composition. In other embodiments, the acid comprises about 1% to about 7% by weight of the composition. In yet other embodiments, the acid comprises about 5% to about 30% by weight of the cleaning composition.

The acid and carbonate or bicarbonate salt may result in the composition being effervescent. In certain embodiments, the presence of bubbles results from the formation of carbon dioxide. For instance, when added to a liquid, such as water, a mixture of at least one acid and at least one carbonate or bicarbonate salt results in a chemical reaction that liberates carbon dioxide. In one aspect, both the acid and the salt may be in anhydrous form.

The term "effervescent," as defined herein, means any product capable of forming bubbles in liquid environments and may also be considered any product capable of liberating carbon dioxide in or out of liquid environments. Likewise, "effervescence" means forming bubbles in liquid environments or liberating carbon dioxide in or out of liquid environments.

According to some embodiments, the solid unit dose toilet does not include an effervescent agent. According to some other embodiments, the solid unit dose toilet includes an effervescent agent, but such agent is not a carbonate acid or salt.

Color

The cleaning composition may further include a colorant. The colorant may be oil- or water-soluble, and typically is an anhydrous powder dye. The amount of colorant to be used may depend on the color intensity desired and the cost of the dye, and may be added at levels up to about 2.5% by weight of the cleaning composition.

The choice of the colorant will depend largely on the color desired for the water into which the cleaning compositions is to be dispensed. Examples of suitable water-soluble colorants include, but are not limited to, acid blue #9, Basacid Blue NB 755®, FD&C yellow #5, FD&C Red #33, and D&C Green #8. Oil-soluble colorants include, but are not limited to, Nitro Fast Red A 4B®, solvent yellow 72, Sandoplast Green G® and Unicert Blue.

Fragrance

In certain embodiments, the cleaning compositions include fragrance and/or perfume. In some of these embodiments, the fragrance may be released into the atmosphere through the formation of carbon dioxide. The fragrance is typically present in an amount of up to about 6% by weight of the cleaning composition.

The fragrance may be an oil fragrance, an essential oil, botanical extracts, synthetic fragrance materials, or other compounds that provide a desirable odor.

In some embodiments, a fragrance oil can be, for example, essential oils such as angelica root oil, anise oil, arnica blossom oil, basil oil, bay oil, champaca blossom oil, citrus oil, silver fir oil, silver fir cone oil, elemi oil, eucalyptus oil, fennel oil, pine needle oil, galbanum oil, geranium oil, ginger grass oil, guaiac wood oil, gurjun balsam oil, helichrysum oil, ho oil, ginger oil, iris oil, jasmine oil, cajeput oil, calamus oil, chamomile oil, camphor oil, canaga oil, cardamom oil, cassia oil, pine needle oil, copaiba balsam oil, coriander oil, spearmint oil, caraway oil, cumin oil, labdanum oil, lavender oil, lemongrass oil, lime blossom oil, lime oil, mandarin oil, balm oil, mint oil, musk seed oil, muscatel oil, myrrh oil, clove oil, neroli oil, niaouli oil, olibanum oil, orange blossom oil, orange oil, origanum oil, palmarosa oil, patchouli oil, peru balsam oil, petitgrain oil, pepper oil, peppermint oil, pimento oil, pine oil, rose oil, rosemary oil, sage oil, sandalwood oil, celery oil, spike oil, star anise oil, turpentine oil, thuja oil, thyme oil, verbena oil, vetiver oil, juniper berry oil, wormwood oil, wintergreen oil, ylang-ylang oil, hyssop oil, cinnamon oil, cinnamon leaf oil, citronella oil, lemon oil and cypress oil and ambrettolide, ambroxan, alpha-amylcinnamaldehyde, anethol, anisaldehyde, anise alcohol, anisol, anthranilic acid methyl ester, acetophenone, benzyl acetone, benzaldehyde, benzoic acid ethyl ester, benzophenone, benzyl alcohol, benzyl acetate, benzyl benzoate, benzyl formate, benzyl valerianate, borneol, bornyl acetate, boisambrene forte, alpha-bromostyrene, n-decyl aldehyde, n-dodecyl aldehyde, eugenol, eugenol methyl ether, eucalyptol, farnesol, fenchone, fenchyl acetate, geranyl acetate, geranyl formate, heliotropin, heptine carboxylic acid methyl ester, heptaldehyde, hydroquinone dimethyl ether, hydroxycinnamaldehyde, hydroxycinnamyl alcohol, indol, irone, isoeugenol, isoeugenol methyl ether, isosafrole, jasmone, camphor, carvacrol, carvone, p-cresol methyl ether, cumarin, p-methoxyacetophenone, methyl n-amyl ketone, methyl anthranilic acid methyl ester, p-methyl acetophenone, methyl chavicol, p-methyl quinoline, methyl beta-naphthyl ketone, methyl n-nonyl acetaldehyde, methyl n-nonyl ketone, muscone, beta-naphthol ethyl ether, beta-naphthol methyl ether, nerol, n-nonyl aldehyde, nonyl alcohol, n-octyl aldehyde, p-oxy-acetophenone, pentadecanolide, beta-phenyl ethyl alcohol, phenyl acetic acid, pulegone, safrole, salicylic acid isoamyl ester, salicylic acid methyl ester, salicylic acid hexyl ester, salicylic acid cyclohexyl ester, santalol, sandelice, skatole, terpineol, thymene, thymol, troenan, gamma-undelactone, vanillin, veratrum aldehyde, cinnmaldehyde, cinnamyl alcohol, cinnamic acid, cinnamic acid ethyl ester, cinnamic acid benzyl ester, diphenyl oxide, limonene, linalool, linalyl acetate and propionate, melusat, menthol, menthone, methyl n-heptenone pinene, phenyl acetaldehyde, terpinyl acetate, citral, citronellal, and mixtures thereof.

In some embodiments, the fragrance can be an ester, an ether, an aldehyde, a ketone, an alcohol, a hydrocarbon, an essential oil, and a combination thereof.

In some embodiments, the fragrance can be, for example, adoxal (2,6,10-trimethyl-9-undecenal), anisaldehyde (4-methoxybenzaldehyde), cymal (3-(4-isopropyl-phenyl)-2-methylpropanal), ethylvanillin, florhydral (3-(3-isopropylphenyl)butanal), helional (3-(3,4-methylenedioxyphenyl)-2-methylpropanal), heliotropin, hydroxycitronellal, lauraldehyde, lyral (3- and 4-(4-hydroxy-4-methylpentyl)-3-cyclohexene-1-carboxaldehyde), methyl nonyl acetaldehyde, lilial (3-(4-tert-butylphenyl)-2-methylpropanal), phenyl acetaldehyde, undecylenaldehyde, vanillin, 2,6,10-trimethyl-9-undecenal, 3-dodecen-1-al, alpha-n-amylcinnamaldehyde, melonal (2,6-dimethyl-5-heptenal), 2,4-dimethyl-3-cyclohexene-1-carboxaldehyde (triplal), 4-methoxybenzaldehyde, benzaldehyde, 3-(4-tert-butylphenyl)propanal, 2-methyl-3-(paramethoxyphenyl) propanal, 2-methyl-4-(2,6,6-timethyl-2(1)-cyclohexen-1-yl)butanal, 3-phenyl-2-propenal, cis-/trans-3,7-dimethyl-2,6-octadien-1-al, 3,7-dimethyl-6-octen-1-al, [(3,7-dimethyl-6-octenyl)oxy]acetaldehyde, 4-isopropylbenzylaldehyde, 1,2,3,4,5,6,7,8-octahydro-8,8-dimethyl-2-naphthaldehyde, 2,4-dimethyl-3-cyclohexene-1-carboxaldehyde, 2-methyl-3-(isopropylphenyl)propanal, 1-decanal, 2,6-dimethyl-5-heptenal, 4-(tricyclo[5.2.1.0(2,6)]decylidene-8)butanal, octahydro-4,7-methano-Hindenecarboxaldehyde, 3-ethoxy-4-hydroxybenzaldehyde, para-ethyl-alpha, alphadimethylhydrocinnamaldehyde, alpha-methyl-3,4-(methylenedioxy)hydrocinnamaldehyde, 3,4-ethylenedioxybenzaldehyde, alphan-hexylcinnamaldehyde, m-cymene-7-carboxaldehyde, alpha-methyl phenylacetaldehyde, 7-hydroxy-3,7-dimethyloctanal, undecanal, 2,4,6-trimethyl-3-cyclohexene-1-carboxaldehyde, 4-(3)(4-methyl-3-pentenyl)

cyclohexenecarboxaldehyde, 1-dodecanal, 2,4-dimethylcyclohexene carboxaldehyde, 4-(4-hydroxy-4-methylpentyl)-3-cylohexene-1-carboxaldehyde, 7-methoxy-3,7-dimethyloctan-1-al, 2-methylundecanal, 2-methyldecanal, 1-nonanal, 1-octanal, 2,6,10-trimethyl-5,9-undecadienal, 2-methyl-3-(4-tertbutyl) propanal, dihydrocinnamaldehyde, 1-methyl-4-(4-methyl-3-pentenyl)-3-cyclohexene-1-carboxaldehyde, 5- or 6-methoxyhexahydro-4,7-methanoindane-1-or -2-carboxaldehyde, 3,7-dimethyloctan-1-al, 1-undecanal, 10-undecen-1-al, 4-hydroxy-3-methoxybenzaldehyde, 1-methyl-3-(4-methylpentyl)-3-cyclohexenecarboxaldehyde, 7-hydroxy-3J-dimethyloctanal, trans-4-decenal, 2,6-nonadienal, para-tolylacetaldehyde, 4-methylphenylacetaldehyde, 2-methyl-4-(2,6,6-trimethyl-1-cyclohexen-1-yl)-2-butenal, ortho-methoxycinnamaldehyde, 3,5,6-trimethyl-3-cyclohexene-carboxaldehyde, 3J-dimethyl-2-methylene-6-octenal, phenoxyacetaldehyde, 5,9-dimethyl-4,8-decadienal, peony aldehyde (6,10-dimethyl-3-oxa-5,9-undecadien-1-al), hexahydro-4,7-methanoindane-1-carboxaldehyde, 2-methyloctanal, alpha-methyl-4-(1-methylethyl)benzene acetaldehyde, 6,6-dimethyl-2-norpinene-2-propionaldehyde, paramethylphenoxyacetaldehyde, 2-methyl-3-phenyl-2-propen-1-al, 3,5,5-trimethylhexanal, hexahydro-8,8-dimethyl-2-naphthaldehyde, 3-propyl-bicyclo-[2.2.1]-hept-5-ene-2-carbaldehyde, 9-decenal, 3-methyl-5-phenyl-1-pentanal, methyl nonyl acetaldehyde, hexanal and trans-2-hexenal.

In some embodiments, the fragrance can be, for example, methyl betanaphthyl ketone, musk indanone (1,2,3,5,6,7-hexahydro-1,1,2,3,3-pentamethyl-4H-inden-4-one), tonalide (6-acetyl-1,1,2,4,4,7-hexamethyltetralin), alphadamascone, beta-damascone, delta-damascone, iso-damascone, damascenone, methyl dihydrojasmonate, menthone, carvone, camphor, koavone (3,4,5,6,6-pentamethylhept-3-en-2-one), fenchone, alpha-ionone, beta-ionone, gammamethyl ionone, fleuramone (2-heptylcyclopentanone), dihydrojasmone, cisjasmone, Iso E Super (1-(1,2,3,4,5,6J,8-octahydro-2,3,8,8-tetramethyl-2-naphthalenyl)ethan-1-one (and isomers)), methyl cedrenyl ketone, acetophenone, methyl acetophenone, para-methoxyacetophenone, methyl beta-naphtyl ketone, benzyl acetone, benzophenone, parahydroxyphenylbutanone, celery ketone (3-methyl-5-propyl-2-cyclohexenone), 6-isopropyldecahydro-2-naphtone, dimethyl octenone, frescomenthe (2-butan-2-ylcyclohexan-1-one), 4-(1-ethoxyvinyl)-3,3,5,5-tetramethylcyclohexanone, methyl heptenone, 2-(2-(4-methyl cyclohexen-1-yl)propyl) cyclopentanone, 1-(p-menthen-6(2)yl)-1-propanone, 4-(4-hydroxy-3-methoxyphenyl)-2-butanone, 2-acetyl-3,3-dimethylnorbornane, 6,7-dihydro-1,1,2,3,3-pentamethyl-4(5H) indanone, 4-damascol, dulcinyl(4-(1,3-benzodioxol -5-yl) butan-2-one), Hexalon (1-(2,6,6-trimethyl-2-cyclohexen-1-yl)-1,6-heptadien-3-one), isocyclemone E (2-acetonaphthone-1,2,3,4,5,6,7,8-octahydro-2,3,8,8-tetramethyl), methyl nonyl ketone, methyl cyclocitrone, methyl lavender ketone, orivone (4-tert-amylcyclohexanone), 4-tert-butylcyclohexanone, delphone (2-pentyl cyclopentanone), muscone (CAS 541-91-3), neobutenone (1-(5,5-dimethyl-1-cyclohexenyl)pent-4-en-1-one), plicatone (CAS 41724-19-0), veloutone (2,2,5-trimethyl-5-pentylcyclopentan-1-one), 2,4,4,7-tetramethyloct-6-en-3-one and tetrameran (6,10-dimethylundecen-2-one).

In some embodiments, the fragrance can be, for example, 10-undecen-1-ol, 2,6-dimethylheptan-2-ol, 2-methylbutanol, 2-methylpentanol, 2-henoxyethanol, 2-phenylpropanol, 2-tert-butylcyclohexanol, 3,5,5-trimethylcyclohexanol, 3-hexanol, 3-methyl-5-phenylpentanol, 3-octanol, 3-phenylpropanol, 4-heptenol, 4-isopropylcyclohexanol, 4-tert-butylcyclohexanol, 6,8-dimethyl-2-nonanol, 6-nonen-1-ol, 9-decen-1-ol, α-methylbenzyl alcohol, α-terpineol, amyl salicylate, benzyl alcohol, benzyl salicylate, β-terpineol, butyl salicylate, citronellol, cyclohexyl salicylate, decanol, dihydromyrcenol, dimethyl benzyl carbinol, dimethyl heptanol, dimethyl octanol, ethyl salicylate, ethyl vanillin, eugenol, farnesol, geraniol, heptanol, hexyl salicylate, isoborneol, isoeugenol, isopulegol, linalool, menthol, myrtenol, n-hexanol, nerol, nonanol, octanol, p-menthan-7-ol, phenylethyl alcohol, phenol, phenyl salicylat, tetrahydrogeraniol, tetrahydrolinalool, thymol, trans-2-cis-6-nonadicnol, trans-2-nonen-1-ol, trans-2-octenol, undecanol, vanillin, champiniol, hexenol and cinnamyl alcohol.

In some embodiments, the fragrance can be, for example, for example, benzyl acetate, phenoxyethyl isobutyrate, p-tert-butylcyclohexyl acetate, linalyl acetate, dimethyl benzyl carbinyl acetate (DMBCA), phenyl ethyl acetate, benzyl acetate, ethylmethylphenyl glycinate, allyl cyclohexyl propionate, styralyl propionate, benzyl salicylate, cyclohexyl salicylate, floramat, melusat and jasmacyclat.

In one embodiment, the fragrance can be, for example, for example, benzyl ethyl ether and ambroxan. The hydrocarbons include mainly terpenes, such as limonene and pinene.

In some embodiments, the fragrance is, for example, a musky scent, a pungent scent, a camphoraceous scent, an ethereal scent, a floral scent, a fruity scent, a peppermint scent, an aromatic scent, a gourmand scent, or any combination thereof.

In some embodiments, the fragrance can be mixtures of various fragrances, which can be referred to as a perfume or perfume oil. Perfume oils of this kind may also contain natural fragrance mixtures, as are obtainable from plant sources.

In some embodiments, the fragrance can be a fragrance precursor. "Fragrance precursor" refers to compounds which only release the actual fragrance following chemical conversion/separation, for example, when exposed to light or other environmental conditions, such as pH, temperature, etc. Treatment agents of this kind are often referred to as pro-fragrances.

Other fragrances and/or perfumes useful in the practice of the invention include the fragrances commonly used in the household and industrial cleaning and sanitizing industry.

As those of skill will appreciate, fragrances typically comprise highly concentrated solid ingredients. The presence of a non-hygroscopic solvent may be necessary to dissolve, disperse or mix these solid ingredients to make the fragrance homogenous throughout the solid cleaning head. Since fragrance manufacturers often incorporate solvents directly into their fragrances, coordinating solvent selection with the fragrance manufacturer may be necessary.

In some embodiments, the fragrance is, for example, present in the cleaning composition in an amount of about 0.5 wt. %, about 1.0 wt. %, about 1.5 wt. %, about 2.0 wt. %, about 3.0 wt. %, about 4.0 wt. %, or about 5.0 wt. %. In some embodiments, the fragrance is, for example, present in an amount from about 0.1 wt. % to about 5 wt. %, from about 0.5 wt. % to about 4.5 wt. %, about 0.5 wt. % to about 4 wt. %, from about 1.0 wt. % to about 4 wt. %, or from about 1.5 wt. % to about 4 wt. %.

Other Components

The solid cleaning composition can comprise other customary additives such as binders to hold the different components in the system together, disintegrants to hold the composition together when dry and break the tablet quickly once being exposed to water, tableting aids to ease the compression process and so on.

Binder

The cleaning composition can include water-soluble binder. Those having a having a weight average molecular weight less than 200,000 will typically be more readily soluble in water. Many water-soluble binders are known. The water-soluble binder may be oligomeric or polymeric and may include copolymers and blends thereof. Nonlimiting examples of polymers and copolymers suitable for use as water-soluble binders include polyethylene glycol, polyvinylpyrrolidones, polyvinylpyrrolidone/vinyl acetate copolymers, polyvinyl alcohols, carboxymethyl celluloses, hydroxypropyl cellulose starches, polyethylene oxides, polyacrylamides, polyacrylic acids, cellulose ether polymers, polyethyl oxazolines, esters of polyethylene oxide, esters of polyethylene oxide and polypropylene oxide copolymers, urethanes of polyethylene oxide, and urethanes of polyethylene oxide and polypropylene oxide copolymers.

In one embodiment, a preferred binder is hydroxypropylmethylcellulose. In other embodiments, the preferred binder is corn starch.

The binder may be present from 0% to 15% by weight of the composition, preferably from about 0% to about 10%, most preferably from 0% to about 5% by weight of the cleaning composition.

According to some embodiments, the solid unit dose does not include a binder. According to some other embodiments, the solid unit dose includes a binder, but such binder is not a corn starch binder.

Lubricant

A lubricant may be used in the cleaning formulations. The lubricant should combine hydrophobic and hydrophilic properties in order to achieve both good lubrication and a short disintegration time. Surfactants such as sodium lauryl sulfate, fumaric acid, magnesium stearate and magnesium lauryl sulfate can be used. The lubricant may also be selected from wheat germ oil, canola oil, safflower oil, sunflower seed oil, sesame oil, cotton seed oil, corn oil, palm oil, coconut oil, flax seed oil, olive oil, mineral oil, PEG 200, PEG 300, PEG 400, and combinations thereof.

A lubricant can also be added when compressing the composition. For example, optionally prior to introduction of a preform into a die, one or more of the interior surfaces of the mold may be sprayed with a mold release material or other lubricant such as mineral oil or a paraffin oil.

The lubricant may be included up to 5% by weight of the composition, preferably less than about 1% by weight, more preferably about 0.5% by weight or less of the composition.

Glidant

A glidant may be included in the composition to promote the flow properties of tablet granules or powder materials.

Examples of glidants that may be used include colloidal silicon dioxide, talc, tribasic calcium phosphate, hydrophobic colloidal silica, hydrophobic fumed silica, cellulose, magnesium oxide, sodium stearate, magnesium silicate, and magnesium trisilicate.

When included, the glidant is typically present at less than 5% by weight of the composition, more preferably about 2% by weight or less, most preferably less than 1% by weight.

The solid composition, after dissolving in water, at a ratio of about 15-16 g of the composition to 1000 mL of water, has a pH from 5 to 9, preferably from 5.5 to 6.5, even more preferably from 6.0 to 6.1. Based on conventional knowledge, at such pH ranges, a product made of such composition is not stable. However, it is unexpectedly discovered that tablets made of the formulation can be stored between 4° C. and 50° C. up to 3 months. The tablets do not suffer from; cracking, melting, or color changes. The tablets can have a long shelf life at room temperature up to 1 to 3 years.

Methods of Use

To use the cleaning compositions to clean a surface, the composition is compressed e.g., into a tablet and the compressed unit is exposed to a solvent, typically water, which is capable of dissolving the water-soluble filler/soaps and surfactant. The cleaning composition may be submerged in water from a toilet, sink, or bathtub depending on the surface being cleaned.

Upon contact with the solvent, the water-soluble filler begins to dissolve. The surfactant provides the detergent for cleaning the surface. Any abrasive particles are also released onto the surface to be cleaned and provide the abrasive material for scouring the surface. The surfactant will foam when exposed to the solvent. The foam helps to suspend the released abrasive particle for prolonged use in scouring the surface.

The release of the abrasive particles assists in scouring the surface. However, because the abrasive particles are not rigidly adhered to any component, the abrasive particles are allowed to roll during cleaning, which prevents excessive scratching and damage to the surface.

Upon continual exposure to the solvent, a majority of any water-soluble filler and soap is dissolved, and therefore a majority of abrasive particles are exposed to the surface.

Therefore, upon completion of the cleaning, the user may flush the composition down the toilet.

Method of Preparation

The solid compositions described herein can be manufactured in by various methods including direct compression, wet granulation, or dry granulation followed by compression. Alternatively, solids can be formed by an extrusion process.

In one embodiment, the method of manufacture may comprise grinding all powder materials to a fine particle size using a mortar and pestle or by passing through a sieve; melting ingredients, such as nonionic surfactant, to around 80° C. and combining all the materials until uniform. The resulting mixture is them pressed into tablets.

In another embodiment, powder ingredients can be combined in a v-blender or with a mixer and directly compressed into a tablet.

In yet another embodiment, an acid premix and a basic premix may be prepared and sieved or ground to a fine particle size. The two mixtures can each be wet granulated and dried in an oven. The dried granules are blended together with any extragranular glidant and/or lubricant. The final mixture is compressed into tablets.

In a further embodiment, the method of manufacture may comprise extruding the treatment composition and cutting into pucks. The extrusion process may be a co-extrusion process and the head has at least two distinct portions having different compositions. The method may include a step of wrapping the head in a water-soluble film.

Typically, the unit dose is manufactured by compression on conventional tablet press using round or oval convex or flat face tooling. In preferred embodiments, the tooling is designed such that the compressed solid contains an indentation in at least one of its surfaces that can be adapted to receive a wand. The depth of the indentation Yc-Yd can be less than the height Ya-Yb or can be the same as height Ya-Yb. In one embodiment, the compressed solid can comprise an annular shape with a cylindrical socket 36 in its center that extends either partially or entirely through the height of the compressed solid, whereby the compressed solid can be mounted on a pin extending from a wand.

The depth of the indentation may be anywhere from 25% to 100% of the height of the compressed solid.

Weights of tablets: the tablets will typically weigh about 1 to about 70 grams, more preferably about 10 to about 50 grams, most preferably 20 to about 35 grams. In certain embodiments, a tablet weighs about 2 to 3 grams, more preferably 2.25 to 2.5 g. In other embodiments, the tablet weights about 40 to 50 grams, or about 45 grams.

Hardness: A tablet strength above 15 N is acceptable, more preferably the tablet hardness is over 20 N, most preferably tablet hardness is greater than 50 N.

EXAMPLES

Example 1: Virgin Soap Pellets

Virgin soap pellets refer to glycerin-based tallow soaps, which are known in the art. For example, in MSDS of one type of DIAL Bar Soap, it discloses the following composition/information on ingredients in Table 1.

TABLE 1

| CAS No. | Ingredient | Wt % |
|---|---|---|
| 67701-11-5 & 67701-10-4 | Sodium Soap | 60-100 |
| 56-81-5 | Glycerin | 1-5 |

Additionally, various virgin soap pellets or the like have been disclosed in U.S. Pat. Nos. 5,296,159, 5,534,265, 5,585,104, 5,703,026, 5,720,961, 5,952,289,5,965,508, 6,054,425, and 6,172,026, the disclosures of which are incorporated into this application in their entireties.

Example 2: Toilet Cleaning Tablet Compositions

Three toilet cleaning tablet compositions shown in Table 2 were prepared using the DIAL Bar Soap virgin soap pellets of Table 1 in Example 1. Composition 1 is representative of a base formula whereas Compositions 2 and 3 include Borax.

TABLE 2

| Ingredient | Activity | Comp. 1 | Comp. 2 | Comp. 3 |
|---|---|---|---|---|
| Virgin Soap Pellets | 100 | 18.00 | 18.00 | 18.00 |
| Sodium Chloride | 100 | 4.00 | 2.00 | 0.00 |
| Borax | 100 | 0.00 | 2.00 | 4.00 |
| $C_{14/16}$ alpha olefin sulphonate, sodium salt | 90 | 14.00 | 14.00 | 14.00 |
| Sodium Bicarbonate | 100 | 37.22 | 37.22 | 37.22 |
| Citric Acid | 100 | 20.25 | 20.25 | 20.25 |
| Corn Starch | 100 | 4.00 | 4.00 | 4.00 |
| Acid Blue | 100 | 0.04 | 0.04 | 0.04 |
| Fragrance | | 2.50 | 2.50 | 2.50 |

The Borax listed in Table 2 is commercially available as 20 MULE TEAM BORAX as 99% sodium tetraborate $(Na_2B_4O_7)\cdot 10H_2O$ and 1% water. The virgin soap pellets, salt, citric acid, sodium bicarbonate, corn starch, anionic surfactant, powder dye and borax were combined into one mixture and homogenized. The fragrance oil was added last. Tablets weighing 45 grams were compressed on a Carver press using 7 metric tons force.

Example 3: pH and Stability

Based on the formulas in Table 2, the pH after dissolving were 6.0 to 6.1. To measure the pH of the formula 15.85 g (35.22% of 45 g) of each formula was dissolved in 1000 mL of water. After mixing for 2 minutes with a stir bar the formula pH was measured using a pH probe.

The tablets of Example 2 were stored at 4° C. and 50° C. The tablets were stable and do not suffer from; cracking, melting, or color changes at both temperatures for over 1 month.

Example 4: Breakage Test

Tablets from Example 1 were tested for cleaning time to breakage by attaching the 45-gram puck to a reusable wand, dipping the puck once into toilet bowl water and then cleaning above the water line in the ceramic bowl for 1 minute and then under the water line (i.e. submerged in water) until breakage of puck from wand. The toilet used was a Standard American model toilet that has approximately 1.28 gallons per flush (Standard American, model 4021N, water level set at 7/16 inches below overflow top). Results are provided in Table 3.

TABLE 3

| Comp. | Total Cleaning Time (seconds) | Improvement (%) | Submerged Cleaning Time (seconds) | Improvement (%) |
|---|---|---|---|---|
| 1 | 85 | | 25 | |
| 2 | 120 | 40 | 60 | 200 |
| 3 | 120 | 40 | 60 | 200 |

After pucks fell off wand from below water cleaning, all three formulas dissolved without additional agitation within 10 minutes.

Example 5: Dissolution

The data in Table 4 was generated after making a 10-gram tablet with the Carver press at 2 MT of force. A tablet was placed in 700 mL of water for 10 minutes with no agitation and the weight was measured after removal and letting the tablet air dry for 24 hours.

TABLE 4

| Rep | Dissolution Weight (g) | Dissolution % |
|---|---|---|
| Control (Comp. 1) | | |
| 1 | 7 | 30 |
| 2 | 6.8 | 32 |
| 50/50 Borax:Salt (Comp. 2) | | |
| 1 | 7.6 | 24 |
| 2 | 7.5 | 25 |
| All Borax (Comp. 3) | | |
| 1 | 7.2 | 28 |
| 2 | 7.1 | 29 |

It will be appreciated that, within the principles described by this specification, a vast number of variations exist. It should also be appreciated that the embodiments described are only embodiments, and are not intended to limit the scope, applicability, or construction of the claims in any way.

What is claimed is:

1. A solid unit dose of a toilet cleaning composition comprising:

an anionic surfactant;

virgin soap pellets;

a carbonate or bicarbonate salt;
an acid; and
borax,
wherein the virgin soap pellets comprise 18% to about 35% by weight of the toilet cleaning composition.

2. The solid unit dose of claim 1, wherein the borax comprises about 0.5% to about 10% by weight of the toilet cleaning composition.

3. The solid unit dose of claim 1, wherein the virgin soap pellets comprise about 20% to about 35% by weight of the toilet cleaning composition.

4. The solid unit dose of claim 1, wherein the virgin soap pellets comprise about 55% to about 90% by weight of a soap mixture, and the soap mixture further comprises about 0.5% to 5% by weight free fatty acids, glycerin, and one or more chelating agents or stabilizers.

5. The solid unit dose of claim 4, wherein the soap mixture further comprises monovalent salts of tallow and palm kernel fatty acids.

6. The solid unit dose of claim 1, wherein the anionic surfactant is selected from the group consisting of sodium dodecylbenzenesulfonate, sodium cocoyl isethionate, sodium olefin sulphonate, and combinations thereof.

7. The solid unit dose of claim 1, wherein the acid comprises about 1% to about 30% by weight of the toilet cleaning composition.

8. The solid unit dose of claim 1, wherein the acid consists of glycolic acid or citric acid.

9. The solid unit dose of claim 1, wherein the unit dose comprises an indentation in at least one of its surfaces that is adapted to receive and engage a wand.

10. The solid unit dose of claim 1, wherein the unit dose weighs about 25 to about 45 grams.

11. The solid unit dose of claim 1, wherein time to breakage of the unit dose when submerged in toilet water is delayed compared to a unit dose having no boron compound.

12. The solid unit dose of claim 1, wherein the toilet cleaning composition is in the form of at least one of powders or pellets that are compressed into the solid unit dose.

13. A dissolvable toilet cleaning tablet comprising:
an anionic surfactant;
virgin soap pellets; and
one or more boron compounds,
wherein the virgin soap pellets comprise 18% to about 35% by weight of the tablet,
wherein greater than 20% of the tablet dissolves when placed in 700 ml of water for 10 minutes with no agitation, and
wherein the tablet has a top surface, a bottom surface, and a height extending from the top surface to the bottom surface, the top surface having an indentation adapted to receive and engage with a wand member.

14. The dissolvable toilet cleaning tablet of claim 13, wherein the tablet has a hardness of 15 N or greater than 15 N.

15. A package comprising the dissolvable toilet cleaning tablet of claim 13 and a wand member.

16. A solid toilet cleaning composition comprising:
about 5% to about 50% by weight anionic surfactant;
about 5-20% by weight of a carbonate or bicarbonate salt;
about 1% to about 30% by weight of an acid;
18% to about 35% by weight virgin soap pellets; and
about 0.5% to about 10% by weight of a boron compound,
wherein the solid toilet cleaning composition is provided as a unit dose, and
wherein time to breakage of the unit dose when submerged in toilet water is delayed compared to a unit dose having no boron compound.

17. The solid toilet cleaning composition of claim 16, wherein the boron compound comprises 70% or more of sodium tetraborate.

18. The solid toilet cleaning composition of claim 16, wherein the virgin soap pellets comprise about 55% to about 90% by weight of a soap mixture, and the soap mixture further comprises about 0.5% to 5% by weight free fatty acids, glycerin, and one or more chelating agents or stabilizers.

19. The solid toilet cleaning composition of claim 18, wherein the soap mixture further comprises monovalent salts of tallow and palm kernel fatty acids.

20. The solid toilet cleaning composition of claim 16, wherein the unit dose has a top surface, a bottom surface, and a height extending from the top surface to the bottom surface, the top surface having an indentation from 25% to 100% of the height of the unit dose that is adapted to receive and engage with a wand member.

* * * * *